(12) United States Patent  
Arnold (10) Patent No.: US 7,395,667 B2
(45) Date of Patent: Jul. 8, 2008

(54) ELECTRICALLY DRIVEN POWER BRAKE BOOSTER

(76) Inventor: Jeffrey T. Arnold, 454 Milcross Rd., Lancaster, PA (US) 17601

( * ) Notice: Subject to any disclaimer, the term of this patent is extended or adjusted under 35 U.S.C. 154(b) by 166 days.

(21) Appl. No.: 11/380,706

(22) Filed: Apr. 28, 2006

(65) Prior Publication Data

US 2007/0251231 A1 Nov. 1, 2007

(51) Int. Cl.
F15B 7/08 (2006.01)
(52) U.S. Cl. .......................................... 60/545; 60/594
(58) Field of Classification Search .................. 60/537, 60/538, 545, 594; 91/1; 92/5 R
See application file for complete search history.

(56) References Cited

U.S. PATENT DOCUMENTS

| | | |
|---|---|---|
| 2,871,827 A | 2/1959 | Euga |
| 3,048,976 A | 8/1962 | Grigsby et al. |
| 4,224,832 A | 9/1980 | Prohaska et al. |
| 4,395,883 A | 8/1983 | Melinat |
| 4,812,723 A | 3/1989 | Shimizu |
| 4,918,921 A | 4/1990 | Leigh-Monstevens et al. |
| 5,549,361 A | 8/1996 | Sorensen |
| 6,105,737 A | 8/2000 | Weigert et al. |
| 6,164,183 A | 12/2000 | Fulks et al. |
| 6,230,492 B1 | 5/2001 | Kingston et al. |
| 6,574,959 B2 | 6/2003 | Fulks et al. |
| 6,634,724 B2 | 10/2003 | Kobayashi et al. |
| 6,758,041 B2 | 7/2004 | Bishop et al. |
| 6,945,610 B1 | 9/2005 | Mizutani et al. |
| 6,971,237 B2 | 12/2005 | Geiger |
| 2002/0053205 A1 | 5/2002 | Geiger et al. |

Primary Examiner—Michael Leslie
(74) Attorney, Agent, or Firm—McNees Wallace & Nurick LLC (57) ABSTRACT

An electrically driven power brake booster having an electrically driven actuator. A lever is pivotably attached to a first pivot point coincident with a the pivot point of the operator controlled primary brake pedal lever. The lever has a first end and a second end, with the first end being attached to a brake rod of a master cylinder of a brake system and the second end being attached to the actuator. The actuator is activated by a signal indicating that braking is desired. This activation includes providing a first force to the second end sufficient to augment a second force from a brake pedal provided to the first end on the brake rod.

13 Claims, 8 Drawing Sheets

ELECTRICALLY DRIVEN POWER BRAKE BOOSTER

FIELD OF THE INVENTION

The present invention is directed to vehicle braking systems. Specifically, the present invention is directed to augmentation systems for vehicle braking systems.

BACKGROUND OF THE INVENTION

Braking systems for automobiles, trucks, buses, and motor homes typically include a push rod actuated master cylinder for generating a hydraulic pressure that is transmitted through brake lines to actuate hydraulic brakes attached to the wheels of the vehicle. The actuation of the brakes acts to slow or stop the vehicle. It is desirable in such hydraulic brake systems for vehicles to include a power brake booster for augmenting the force applied to a brake pedal connected to the push rod. The power brake booster allows the operator to operate the brakes with a reduced amount of force to the brake pedal.

Known power brake boosters typically utilize engine vacuum, hydraulic pressure, or pneumatic pressure to drive one or more pistons connected to the master cylinder for augmenting the force applied to the master cylinder via the push rod when the operator is pushing on the brake pedal. One source for vacuum for use in the power brake booster is the vacuum created in the induction system of a running internal combustion engine. Vacuum may also be provided by an engine driven or electrically driven vacuum pump. Hydraulic pressure or pneumatic pressure actuated power brake boosters require a source of pressure such as the power steering pump or a hydraulic boost pump for hydraulic systems or an air compressor for pneumatic systems. These known systems suffer from the drawback that they require a plurality of components that may fail or not function properly during times when the engine is not running.

Another drawback of known systems is that the power brake booster system takes up a large amount of space and is generally placed in the engine compartment. The positioning of the power brake booster in the engine compartment reduces the amount of space in the engine compartment for larger engines or other engine components. The space in the engine compartment is particularly important in the assembly of custom vehicles or vehicles requiring a large number of accessory components.

What is needed is a power brake booster system that provides augmentation to the braking system, occupying a small amount of space, being operable during times when the engine is not running and not suffering from the drawbacks of known braking systems.

SUMMARY OF THE INVENTION

The present invention includes an electrically driven power brake booster having an electrically driven actuator. A secondary lever is pivotably attached to a first pivot point pivoting so the fulcrum point is coincident with the primary brake lever. The lever has a first end and a second end, with the first end being attached to a brake rod of a master cylinder of a brake system and the second end being attached to the actuator. The actuator is activated by a signal indicating that braking is desired. This activation includes providing a first force to the second end sufficient to augment a second force from a brake pedal provided to the first end on the brake rod.

Another embodiment of the present invention includes a kit for replacement of a power brake booster system. The kit includes a mountable frame sufficiently small to fit under a dashboard of a vehicle, an electrically driven actuator attached to the frame, and a secondary lever pivotably attached to a first pivot point. The secondary lever has a first end and a second end, with the first pivot point being attached to the frame. The first end is capable of attachment to a brake rod of a master cylinder of a brake system. The second end is attached to the actuator. The kit further includes a switch capable of determining the force or displacement of a brake pedal and providing a signal. The actuator is activated by the signal providing a first force to the second end sufficient to augment a second force from a brake pedal provided to the first end on the brake rod.

Still another embodiment of the present invention includes an electrically driven power brake system having an electrically driven actuator. A secondary lever is pivotably attached to a first pivot point. The secondary lever has a first end and a second end, with the first end being attached to a brake rod of a master cylinder of a brake system and the second end being attached to the actuator. The actuator is activated by a signal indicating an amount of braking required. This activation includes providing a force to the second end sufficient to drive the brake rod into the master cylinder with sufficient force to provide the desired amount of braking.

One advantage of the power brake booster system of the present invention is that the system provides equal or greater augmentation of the braking system, while occupying less space, and preferably occupying no additional space in the engine compartment.

Another advantage of the power brake booster system of the present invention is that the system may operate when the engine is not running. Connection to the battery is sufficient to operate the electrically driven power brake booster.

Still another advantage of the power brake booster system of the present invention is that the system may be packaged as a kit, wherein the individual components of the system and the kit comprising the entire system are easily serviced and/or replaced.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
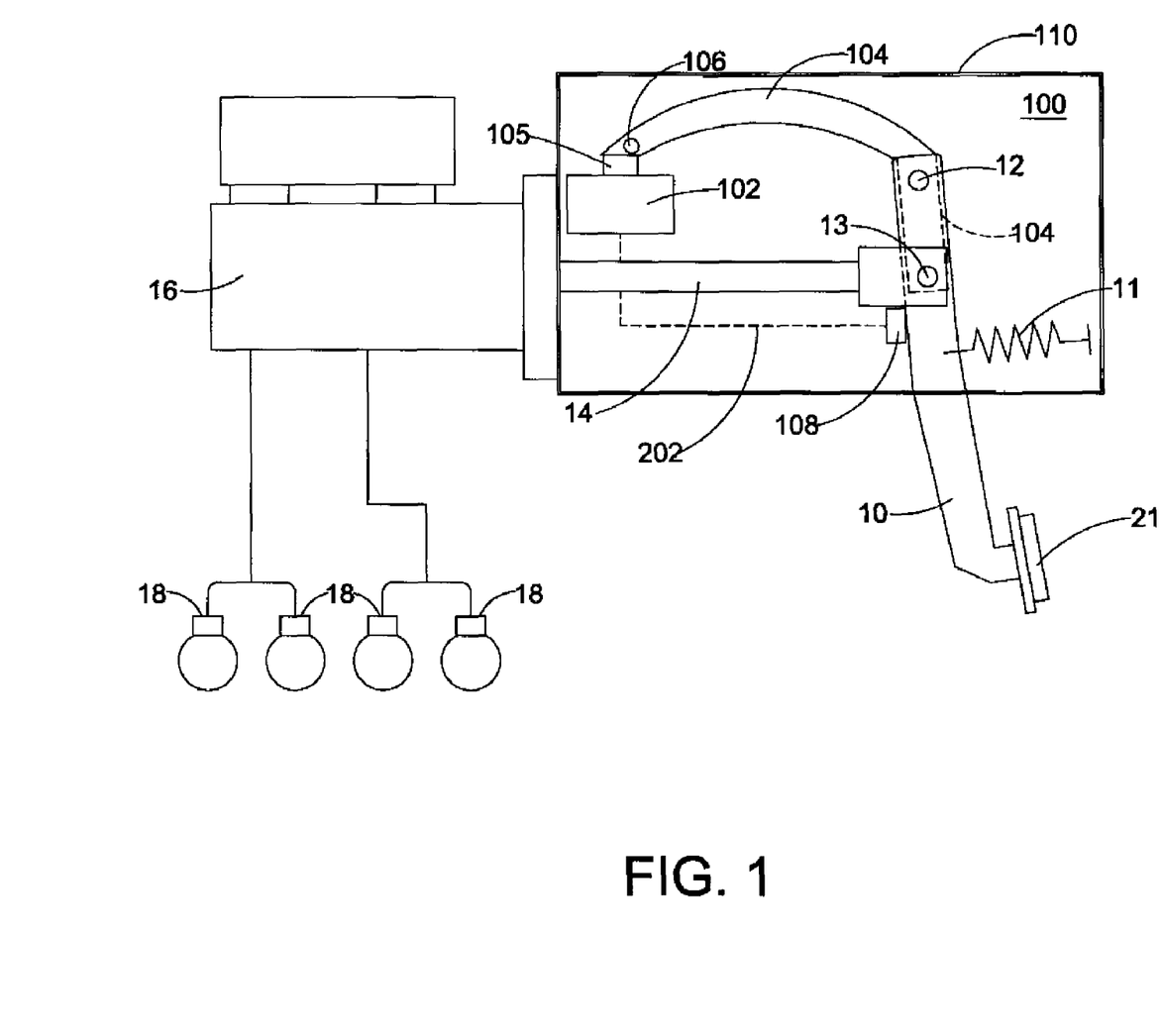
FIG. 1 shows an embodiment of a braking system according to the present invention.

FIG. 1 of the present invention includes a braking system according to an embodiment of the present invention. The braking system shown in FIG. 1 includes a brake booster system 100 for augmenting the force provided on the brake pedal by an operator of a vehicle. The brake pedal includes a primary brake pedal arm 10 and a brake pedal pad 21. The primary brake pedal arm 10 is a lever pivotably mounted about brake pedal pivot point 12. Brake pedal pivot point 12 is a pin or rod mounted with the booster system 100, configured to allow pivoting of both the primary brake pedal arm 10 and secondary lever 104. The primary brake pedal arm 10 is further pivotably connected to brake rod 14 about brake rod pivot point 13. Brake rod pivot point 13 is a pin or rod preferably connecting primary brake pedal arm 10 to secondary lever 104. Secondary lever 104, like primary brake pedal arm 10, is also pivotably connected to the brake pedal pivot point 12. Pivoting motion of the primary brake pedal arm 10 about brake pedal pivot point 12 due to force applied to brake pedal pad 21, disposed at one end of the primary brake pedal arm 10, provides a force at brake rod pivot point 13, which urges brake rod 14 into master cylinder 16. Booster system 100 and the components therein are at least partially housed within a mountable housing 110, the mountable housing 110 being sufficiently small to fit under a dashboard of a vehicle. Booster system 100 augments the force provided to primary brake pedal arm 10 via brake pedal pad 21 and permits the operator of the braking system to apply braking with relatively little force on brake pedal pad 21. Although the brake pedal shown includes an arm pivoting about brake pedal pivot point 12, the geometry of the brake pedal may be any suitable geometry for providing a force on the brake rod 14. Suitable geometries may include, but are not limited, non-pivoting pedals applying direct force to the brake rod 14.

Master cylinder 16 is any known arrangement suitable for providing braking to a vehicle. Master cylinder system, including master cylinder 16, may include, but is not limited to a known hydraulic or pneumatic system. Master cylinder 16 provides fluid to the individual braking mechanisms 18. The braking mechanisms 18 may be any suitable known vehicle braking mechanism, including, but not limited to drum brakes and disc brakes. Although four braking mechanisms 18 are shown in FIG. 1, any number of braking mechanisms 18 may be used. A spring 11 is preferably connected to primary brake pedal arm 10 to provide a force returning the primary brake pedal arm 10 to its original position.

As shown in FIG. 1, the brake booster system 100, according to this embodiment of the present invention, includes an electrically driven actuator 102. The actuator 102 is connected to secondary lever 104 via actuator drive rod 105. The actuator 102 may be any electrically driven device capable of providing a rotational force or linear force on a drive mechanism, such as drive rod 105. The force applied rotates the drive rod 105 or linearly displaces the drive rod 105, preferably along its center axis. The actuator drive rod 105 may be any suitable geometry connectable to secondary lever 104. Secondary lever 104 is pivotably mounted about brake pedal pivot point 12 and is connected to the brake rod 14 via brake rod pivot point 13. The configuration of the booster system 100 shown in FIG. 1 provides a common pivot point about which the primary brake pedal arm 10 and the secondary lever 104 pivots. In addition, the configuration of the brake booster system 100 provides a common pivot point about which the primary brake pedal arm 10 and the secondary lever 104 connect to the brake rod 14. The booster system 100 further includes a switch 108, electrically connected to the actuator 102 via line 202, that activates the actuator. The switch 108 may be any switch capable of activating the actuator 102. In a preferred embodiment, the switch 108 is a pressure switch that provides a signal to the actuator 102 corresponding to the force or displacement provided to the primary brake pedal arm 10 due to the application of force to brake pedal pad 21.

Pressure switch 108 can be adjustable, allowing the activating pressure to be varied as desired by the operator. For example, the pressure switch may be adjusted to react to a pressure from about 0.5 pounds to about 3 pounds of pressure, depending on the pressure desirable to the operator.

In the embodiment shown in FIG. 1, the actuator is a motor capable of providing a linear displacement on drive rod 105. When switch 108 senses pressure on or displacement of primary brake pedal arm 10, the switch activates actuator 102. Activation may be providing power to the actuator 102, or may include providing a signal to a controller (not shown) that in turn provides power to the actuator 102. In a preferred embodiment of the invention, the switch 108 provides a signal to actuator 102 corresponding to the linear displacement required to pivot the secondary lever 104 sufficient to drive brake rod 14 or augment the driving of brake rod 14 into the master cylinder 16 to operate braking mechanisms 18.

Figure 2:
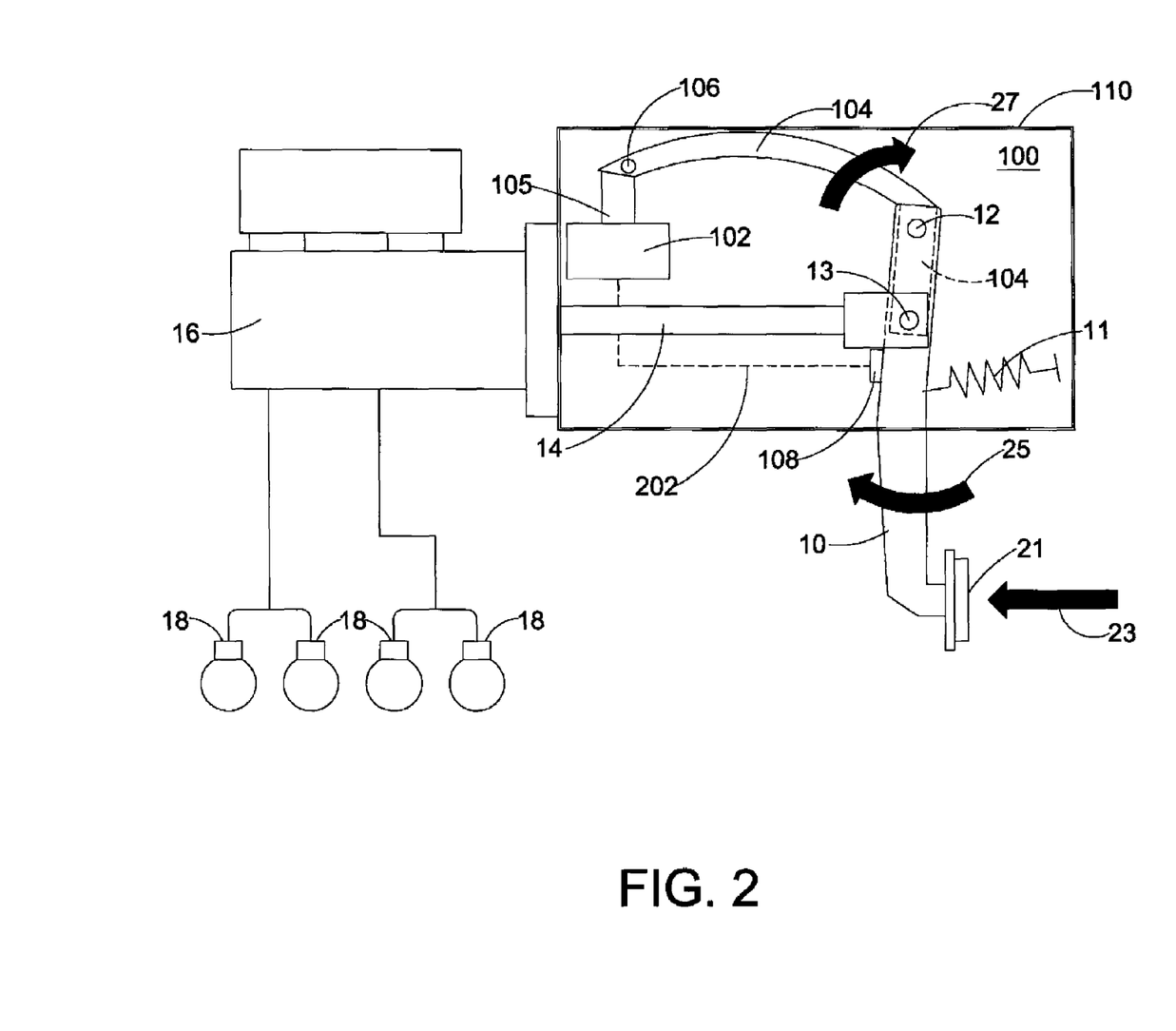
FIG. 2 shows the embodiment in FIG. 1 with the braking system activated.

FIG. 2 shows the embodiment of FIG. 1 with the braking pedal arm 10 depressed (i.e., force has been applied to the brake pedal pad 21). When force 23 is provided by depressing the brake pedal pad 21, the primary brake pedal arm 10 pivots about brake pedal pivot point 12 in direction 25. Switch 108 senses that the brake pedal pad 21 and primary brake pedal arm 10 are depressed and sends a signal to actuator 102 via line 202. Although the booster system 100 is shown as including a switch 108 and line 202, any arrangement that senses motion and/or pressure on the primary brake pedal arm 10 and is capable of activating the actuator 102 in response to the motion and/or pressure may be used. The actuator 102 of the present invention may be alternating current (AC) or directed current (DC) actuators 102, and may be powered by a battery, an alternating current generator or by a direct current to alternating current transformer. In a preferred embodiment, the source of power for actuator 102 is independent of engine operation. In FIG. 2, the switch 108 activates actuator 102 to provide a linear displacement on drive rod 105, which in turn provides a pivotal force on secondary lever 104 via lever drive pivot point 106. The linear force provided by actuator 102 transfers to brake rod pivot point 13 by rotation of the secondary lever 104 in direction 27 about brake pedal pivot point 12 and combines with the force provided on the primary brake pedal arm 10 (e.g., the force of a driver's foot on the brake pedal pad 21), to provide a linear displacement of the brake rod 14 into the master cylinder 16. The master cylinder 16, in turn, activates braking mechanisms 18 to slow or stop the vehicle. Spring 11, shown as extended in FIG. 2, provides a return force on primary brake pedal arm 10 to return the brake pedal to an initial position when the force is removed, such as when a driver removes his foot from the brake pedal pad 21.

In a preferred embodiment of the invention, the switch 108 is a pressure sensitive switch that provides a signal corresponding to predetermined linear displacements of drive rod 105. Actuators 102 suitable for this embodiment of the invention include, but are not limited to, linear motors. Actuators that may be used with the present invention include, but are not limited to, LMPY-Polynoid linear motors and DC to AC linear motors available from BALDOR UK, Ltd., Bristol, United Kingdom. The actuator 102 preferably extends the drive rod 105 a predetermined distance and is capable of retaining the drive rod 105 in the position while the brake pedal pad 21 is depressed. For example, when a driver depresses the brake pedal pad 21, rotating primary brake pedal arm 10, the switch 108 activates the motor to extend the drive rod 105 an amount corresponding the amount of braking desired. The actuator 102 likewise maintains the drive rod 105 into a desired position until more or less braking is desired or needed and more or less force is provided to the brake pedal pad 21. The switch 108 and actuator 102 arrangement preferably reacts within about 100 milliseconds or less and is capable of releasing or withdrawing the force on secondary lever 104 within 100 milliseconds or less. The arrangement shown in FIGS. 1-2 has the advantage that there are few if any frictional contacts subject to friction and/or requirements of lubrication.

The force provided by secondary lever 104 acted on by actuator 102 is dependent upon the distance between brake pedal pivot point 12 and brake rod pivot point 13. The smaller the distance between brake pedal pivot point 12 and brake rod pivot point 13, the less linear displacement is required by the actuator 102. However, when the distance between point 12 and point 13 is reduced, to achieve an equivalent torque at point 13 to pivot secondary lever 104 about point 12 the force applied to point 12 is increased. Accordingly, the smaller the distance between brake pedal pivot point 12 and brake rod pivot point 13, the greater the linear displacement by the actuator 102 is required, which also requires the system 100 to occupy a greater amount of space. However, when the distance between point 12 and point 13 is larger, the force required by the actuator 102 is reduced. Therefore, the distance between brake pedal pivot point 12 and brake rod pivot point 13 is a distance corresponding to a desired force capacity of the actuator 102 and the space available for linear displacement of the drive rod 105 of the actuator 102. A suitable distance between brake pedal pivot point 12 and brake rod pivot point 13 includes, but is not limited to, about ½ inches to about 1¼ inches. In addition, the length of secondary lever 104, between point 12 and point 106, is related to the force required by actuator 102. The greater the length of the secondary lever 104, between point 12 and point 106, the less force is required. However, the larger secondary lever 104, between point 12 and point 106, requires an increase amount of space to house the system. Likewise, the shorter the secondary lever 104, between point 12 and point 106, the greater the force is required by the actuator 102. Therefore, the length of secondary lever 104, between point 12 and point 106, is selected based on the desired size of the booster system 100 and the force required by actuator 102. A suitable length for secondary lever 104 may include, but is not limited to, about 6½ inches to 10½ inches.

Figure 3:
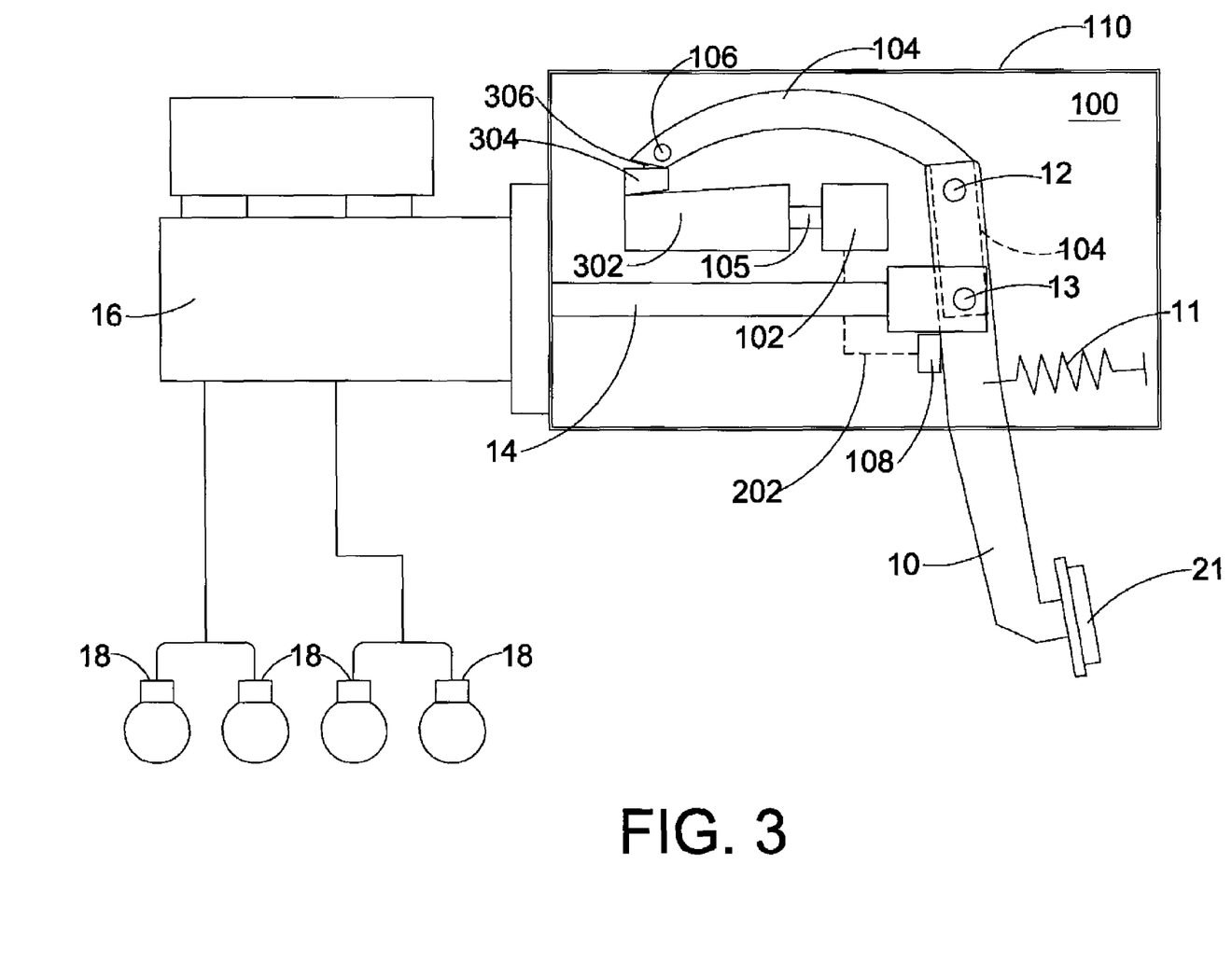
FIG. 3 shows an alternate embodiment of a braking system according to the present invention.

FIG. 3 shows an alternate arrangement of the power brake booster system 100 of the present invention. FIG. 3 includes the arrangement of primary brake pedal arm 10, brake pedal pad 21, spring 11, switch 108, line 202, secondary lever 104, brake rod 14, master cylinder 16, and braking mechanisms 18 shown as described with respect to FIG. 1. However, the embodiment shown in FIG. 3 includes a ramp block 302 driven by actuator 102 in frictional contact with slide block 304. In this embodiment of the invention, a linear force provided by actuator 102 along drive rod 105 provides a linear displacement of ramp block 302. As ramp block 302 moves, the geometry of the ramp block 302 results in a translational displacement of slide block 304. The translational displacement and the corresponding force transfers via linkage 306, providing force on secondary lever 104 via lever drive pivot point 106. The geometry of ramp block 302 may be any suitable geometry that provides a translation displacement of slide block 304, but preferably has a smooth, lubricated surface to minimize friction with a slope corresponding to the desired pivotal rotation of secondary lever 104 about brake pedal pivot point 12.

Figure 4:
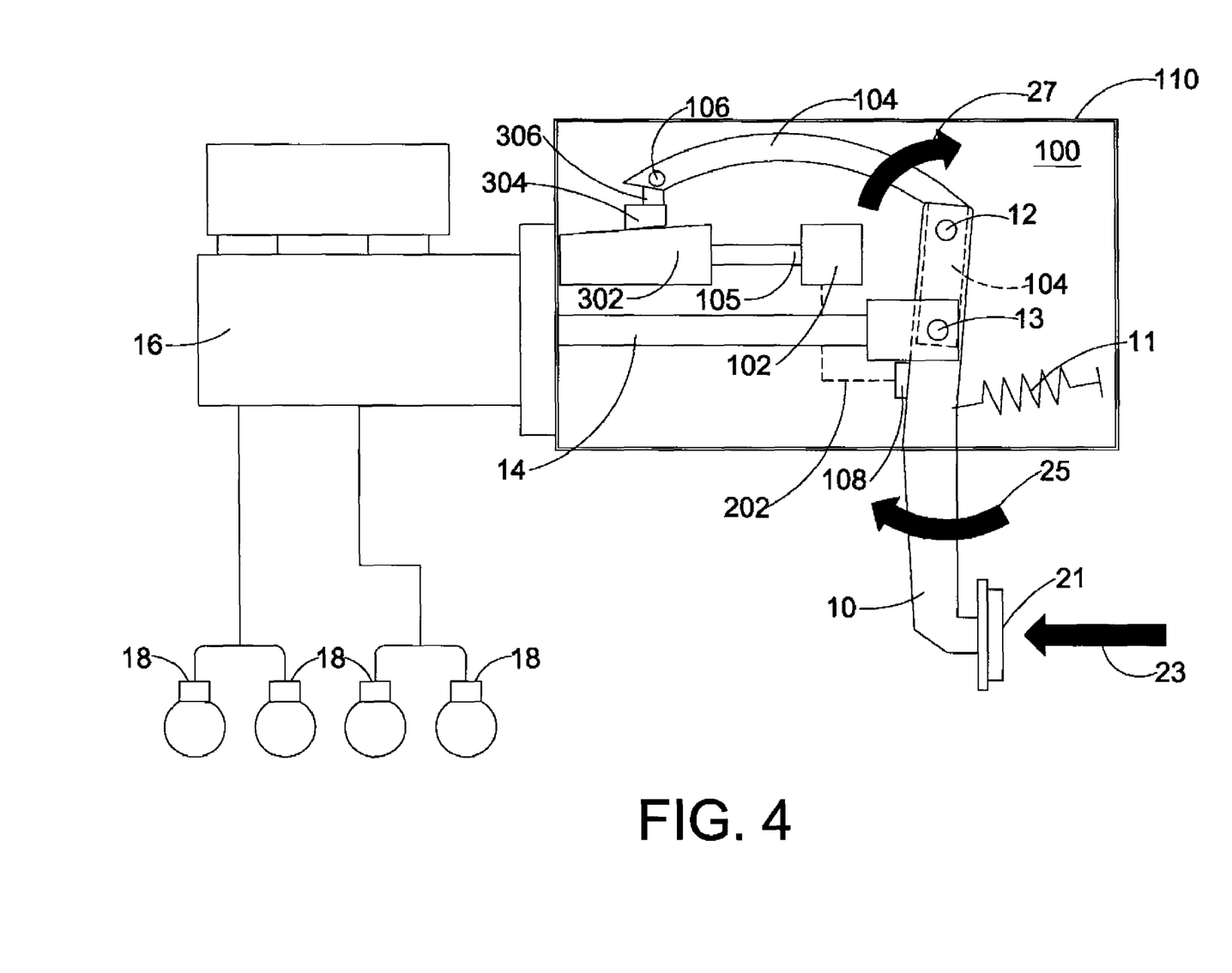
FIG. 4 shows the embodiment in FIG. 3 with the braking system activated.

FIG. 4 shows the embodiment of FIG. 3 with the primary brake pedal arm 10 and brake pedal pad 21 depressed (i.e., force 23 is provided to brake pedal pad 21). In the embodiment shown, switch 108 senses the movement and/or pressure on primary brake pedal arm 10 and/or brake pedal pad 21 and provides the corresponding signal to actuator 102 in a manner previously discussed in FIGS. 1-2. As shown in FIG. 4, primary brake pedal arm 10 is rotated in direction 25. Actuator 102 provides a linear displacement along the axis of drive rod 105, which, similarly, moves ramp block 302 and causes slide block 304 to slide against ramp block 302 creating a linear force through linkage 306 to secondary lever 104. The force transfers to pivot point 13 via rotation of the secondary lever 104 in direction 27 about brake pedal pivot point 12 and combines with the force provided on the primary brake pedal arm 10 (e.g., the force of a driver's foot on the brake pedal pad 21), to provide a linear displacement of the brake rod 14 into the master cylinder 16. The activation of the actuator 102 and switch 108 arrangement operates in the same manner as the actuator 102 and switch 108 arrangement shown and described with respect to FIGS. 1-2. The arrangement shown in FIGS. 3-4 has the advantage that the force required for the actuator 102 is reduced due to use of the sloped geometry of the ramp block 302 against slide block 304.

Figure 5:
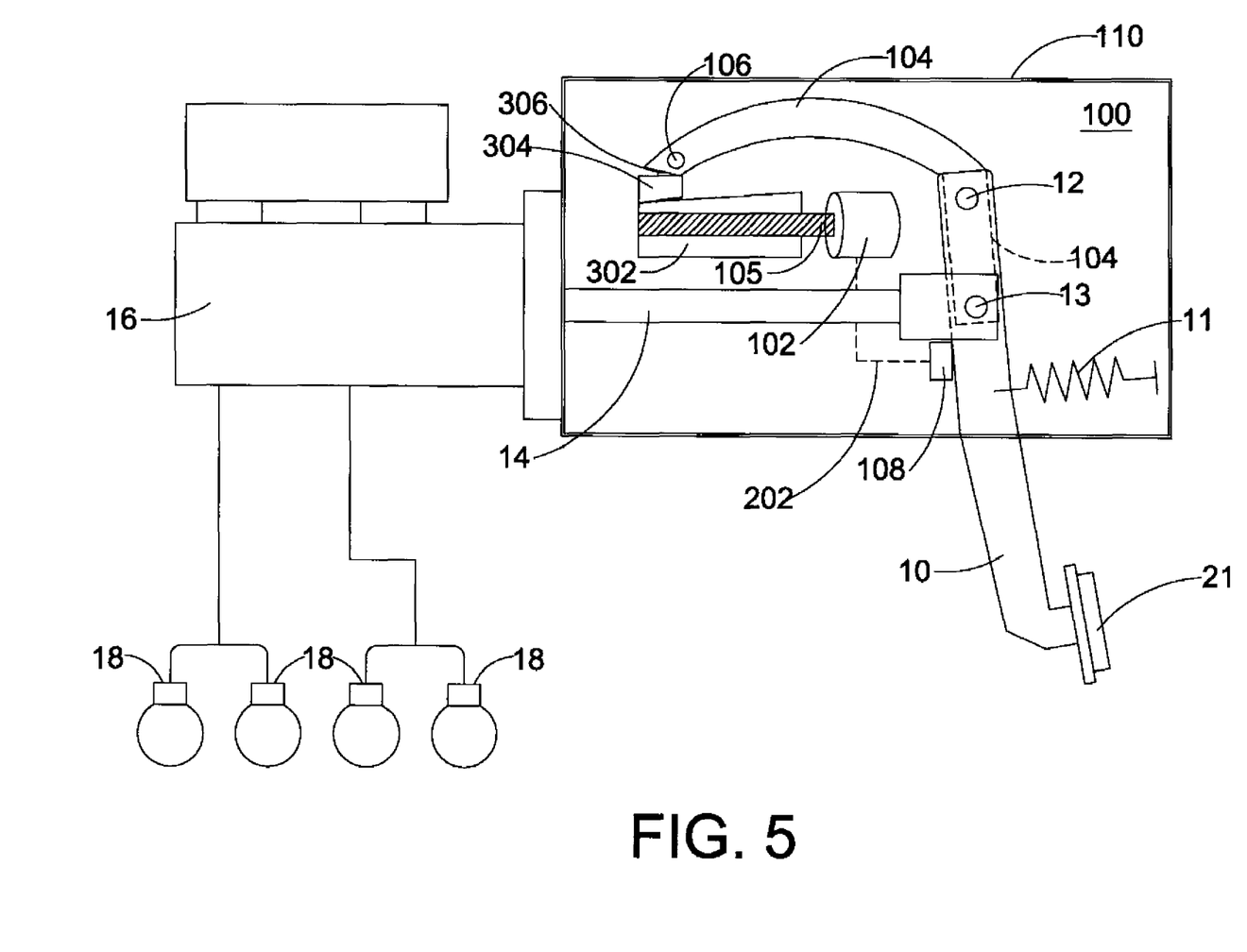
FIG. 5 shows an alternate embodiment of a braking system according to the present invention.

FIG. 5 shows an alternate arrangement of the power brake booster system 100 of the present invention. FIG. 5 includes the arrangement of primary brake pedal arm 10, brake pedal pad 21, spring 11, switch 108, line 202, secondary lever 104, ramp block 302, slide block 304, linkage 306, brake rod 14, master cylinder 16, and braking mechanisms 18 shown as described with respect to FIG. 3. However, the embodiment shown in FIG. 3 includes an actuator 102 that provides a rotational force (i.e., torque), which rotates drive rod 105. Drive rod 105 includes threads that mate with threads formed in ramp block 302 to form a gear drive with slide block 302 to translate the rotational force provided by actuator 102 to a linear force on ramp block 302. In this embodiment of the invention a rotational force provided by actuator 102 along drive rod 105 provides a linear displacement of ramp block 302. As in FIGS. 3-4, as ramp block 302 moves, the geometry of the ramp block 302 results in a translational displacement of slide block 304. The translational displacement and the corresponding force is transferred via linkage 306, which transfers to secondary lever 104 about lever drive pivot point 106. The geometry of ramp block 302 may be any suitable geometry that provides a translation displacement of slide block 304, but preferably has a smooth, lubricated surface to minimize friction with a slope corresponding to the desired pivotal rotation of secondary lever 104 about brake pedal pivot point 12. In another embodiment the slide block 304 and ramp block 302 are arranged and disposed on a closed track moving on ball bearings in order to reduce friction between the slide block 304 and the ramp block 302.

Figure 6:
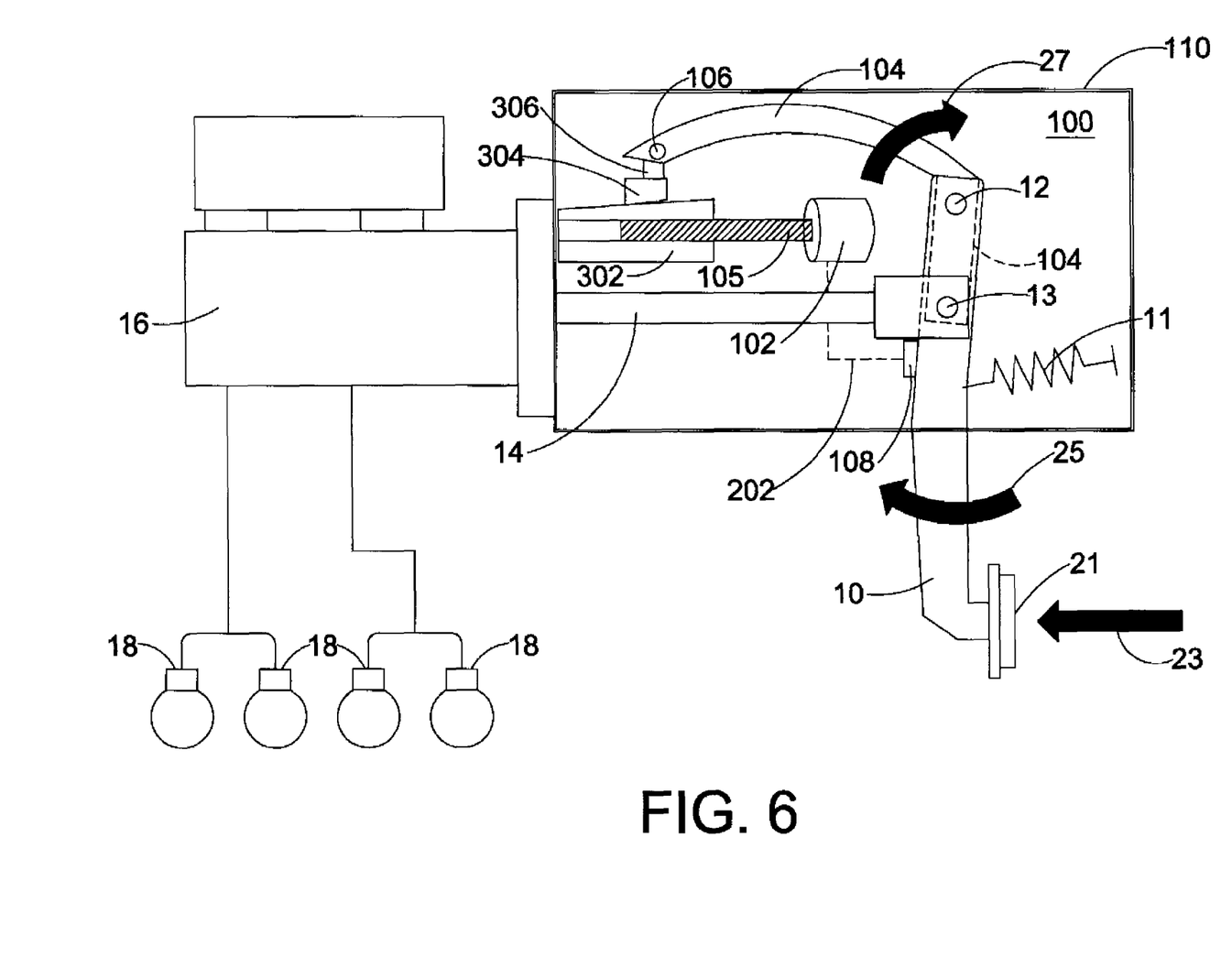
FIG. 6 shows the embodiment in FIG. 5 with the braking system activated.

FIG. 6 shows the embodiment of FIG. 5 with the primary brake pedal arm 10 depressed (i.e., force 23 is provided to brake pedal pad 21). In the embodiment shown, switch 108 senses the movement and/or pressure on primary brake pedal arm 10 and/or brake pedal pad 21 and provides the corresponding signal to actuator 102. As shown in FIG. 6, primary brake pedal arm 10 is rotated in direction 25. Actuator 102 provides torque along the axis of the drive rod 105 causing drive rod 105 to rotate about its axis which, via threads on drive rod 105, linearly moves ramp block 302 along the axis of drive rod 105 and causes slide block 304 to slide against ramp block 302 creating a translational linear force through linkage 306 to secondary lever 104 that transfers to brake rod pivot point 13 via rotation of the secondary lever 104 in direction 27 about brake pedal pivot point 12 and combines with the force provided on the primary brake pedal arm 10 (e.g., the force of a driver's foot on the brake pedal pad 21), to provide a linear displacement of the brake rod 14 into the master cylinder 16. Therefore, the force required to provide the necessary braking force to the master cylinder by the driver of the vehicle on brake pedal pad 21 is reduced, making braking easier. The activation of the actuator 102 and switch 108 arrangement operates in the same manner as the actuator 102 and switch 108 arrangement shown and described with respect to FIGS. 1-4. The threaded arrangement of the ramp block 302 and slide block 304 requires high rotational speeds to achieve the desired reaction time for the application and withdrawal of the primary brake pedal arm 10. The arrangement shown in FIGS. 5-6 has the advantage that the force required for the actuator 102 is reduced due to the ramp block 302 and slide block 304 arrangement and the actuator 102 need only provide rotational forces, reducing the cost of the actuator 102. Due to the mechanical advantage derived by a drive gear arrangement, the amount of rotational force required to rotate drive rod 105 is small.

Figure 7:
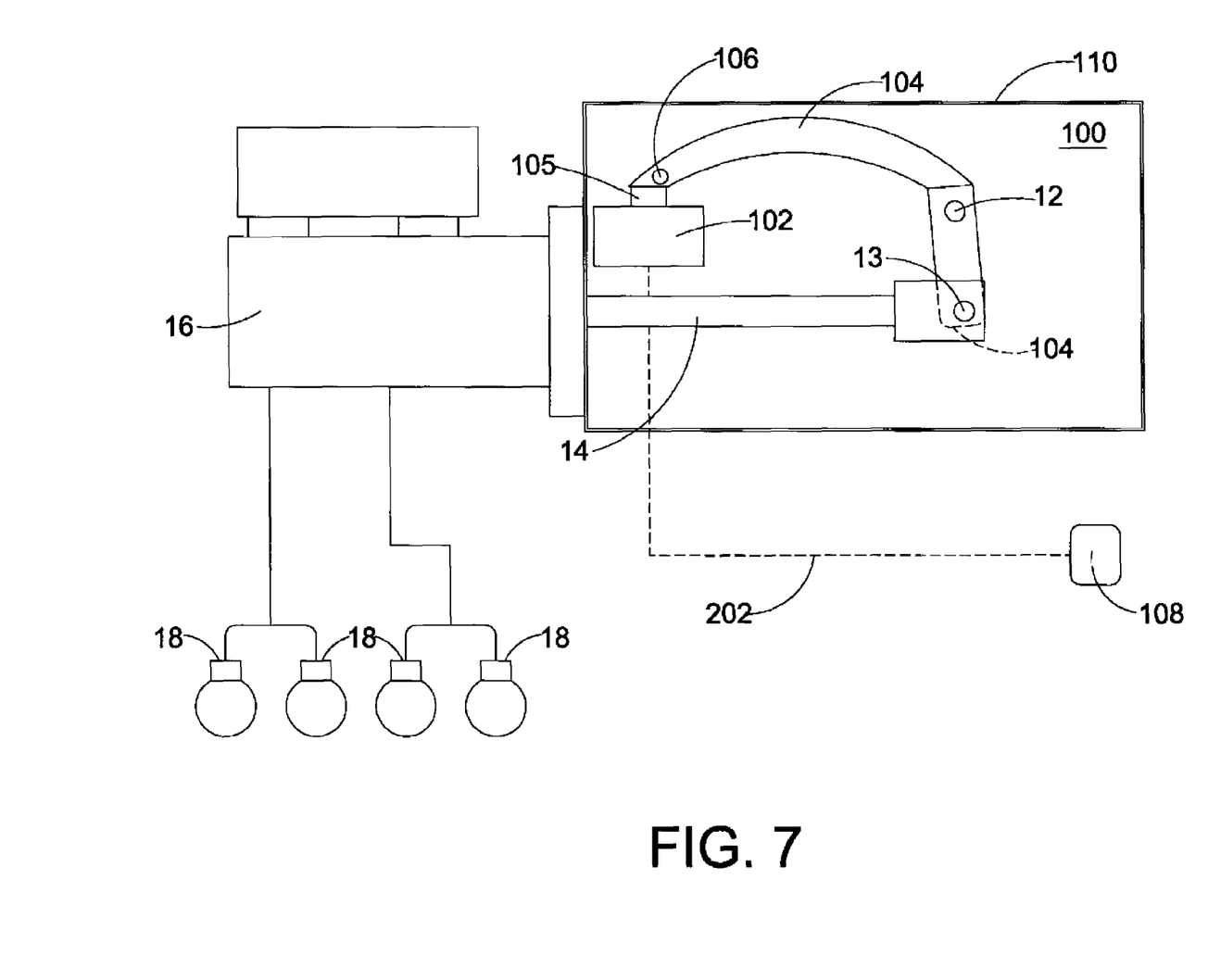
FIG. 7 shows an alternate embodiment of a braking system according to the present invention.

FIG. 7 shows an alternate arrangement of the power brake booster system 100 of the present invention. FIG. 7 includes the arrangement of actuator 102, secondary lever 104, brake rod 14, master cylinder 16, and braking mechanisms 18 shown as described with respect to FIG. 1. However, the embodiment shown in FIG. 7 does not include a brake pedal. The actuator 102 provides a force on secondary lever 104 at lever drive pivot point 106 to drive brake rod 14 via brake rod pivot point 13 into the master cylinder 16 with sufficient force to provide braking at the braking mechanisms 18. The switch 108 may include any suitable arrangement that is capable of providing a signal to the actuator 102. In one embodiment of the invention, the switch is a pressure sensitive switch connected to a button or lever operable by the operator of a vehicle.

Figure 8:
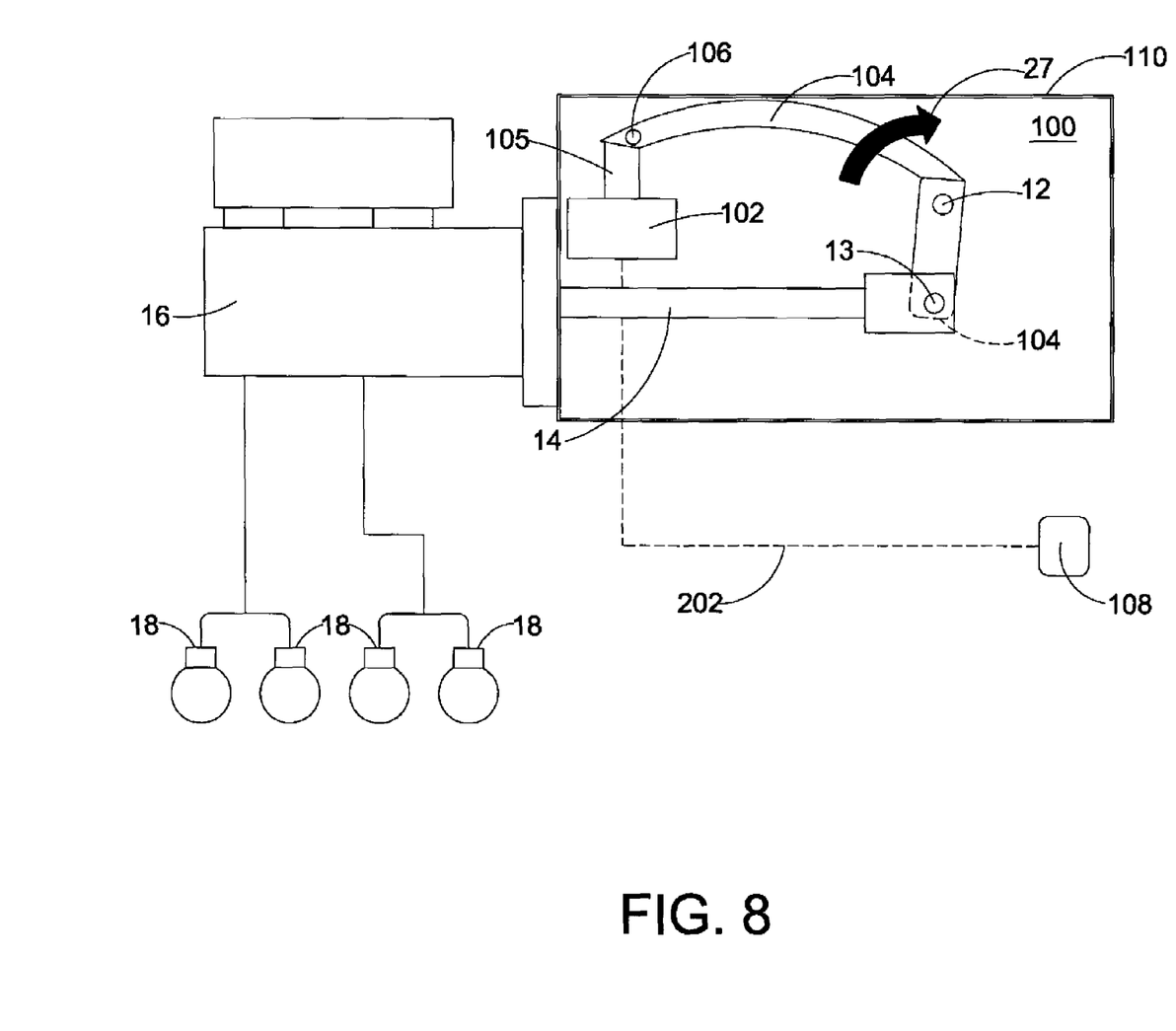
FIG. 8 shows the embodiment in FIG. 7 with the braking system activated.

FIG. 8 shows the embodiment of FIG. 7 with the actuator activated (i.e., a signal for braking has been sensed by switch 108 and has been sent to the actuator). In the embodiment shown, switch 108 senses the movement and/or pressure on a button or lever operated by an operator of a vehicle and provides the corresponding signal to actuator 102. As shown in FIG. 8, secondary lever 104 is rotated in direction 27 by actuator 102. The rotation of the secondary lever 104 drives the brake rod 14 into the master cylinder 16 via brake rod pivot point 13. Although FIGS. 7-8 have been shown with the actuator 102 providing a force directly on secondary lever 104 via lever drive pivot point 106, indirect force through systems like those shown in FIGS. 3-6 may also be used. The arrangement shown in FIGS. 7-8 has the advantage that a brake pedal is not necessary to operate the braking system of a vehicle. The removal of the brake pedal permits braking merely by activation of switch 108 and may allow persons having an inability or difficulty in operating pedals to apply braking to a vehicle in a safe manner.

In another embodiment of the invention, the system 100, with actuator 108 may be placed in communication with systems within the vehicle that may indicate braking is desired or required. For example, the actuator may be activated with a signal from a proximity sensor device. Specifically, if a proximity sensor device sensed an unopened garage door or a child on a tricycle, the actuator 108 may be activated to apply braking to stop the vehicle.

The system 100 according to the invention, as shown in FIGS. 1-8, is preferably mounted outside the engine compartment of the vehicle. For example, the booster system 100 may be mounted under the dashboard of the vehicle. The relative small size of the secondary lever 104 and actuator 102 permits the installation of the booster system 100 in locations previously unavailable for mounting of known booster systems. In addition, the large vacuum power brake booster typically found in vehicles may be removed from the engine compartment making room for additional engine components, accessories or additional space for the engine of the vehicle. The booster system 100 likewise may be provided such that the booster system 100 may be retrofitted on existing vehicles.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An electrically driven power brake booster comprising:
   an electrically driven actuator;
   a lever pivotably attached to a first pivot point, the lever having a first end and a second end;
   the first end being attached to a brake rod of a master cylinder of a brake system;
   the second end being attached to the actuator;
   wherein the actuator is activated by a signal indicating that braking is desired, the activation including providing a first force to the second end sufficient to augment a second force from a brake pedal provided to the first end on the brake rod; and
   wherein the actuator is a linear motor.

2. The power brake booster of claim 1, wherein the actuator provides force corresponding to the signal in less than about 100 milliseconds.

3. A kit for replacement of a power brake booster system comprising:
   a mountable frame sufficiently small to fit under a dashboard of a vehicle;
   an electrically driven actuator attached to the frame;
   a lever pivotably attached to a first pivot point, the lever having a first end and a second end, the first pivot point being attached to the frame;
   the first end being capable of attachment to a brake rod of a master cylinder of a brake system;
   the second end being attached to the actuator;
   a switch capable of determining the force or displacement of a brake pedal and providing a signal;
   wherein the actuator is activated by the signal, the activation including providing a first force to the second end sufficient to augment a second force from the brake pedal provided to the first end on the brake rod; and
   wherein the actuator is a linear motor.

4. The kit of claim 3, wherein the actuator provides a force corresponding to the signal in less than about 100 milliseconds.

5. The kit of claim 3, wherein the switch is a pressure switch capable of providing a variable signal to the actuator.

6. An electrically driven power brake system comprising:
an electrically driven actuator;
a lever pivotably attached to a first pivot point, the lever having a first end and a second end;
the first end being attached to a brake rod of a master cylinder of a brake system;
the second end being attached to the actuator;
wherein the actuator is activated by a signal indicating an amount of braking required, the activation including providing a force to the second end sufficient to drive the brake rod into the master cylinder with sufficient force to provide the desired amount of braking; and
wherein the actuator ia a linear motor.

7. The power brake system of claim 6, wherein the actuator provides force corresponding to the signal in less than about 100 milliseconds.

8. An electrically driven power brake booster comprising:
an electrically driven actuator;
a lever pivotably attached to a first pivot point, the lever having a first end and a second end;
the first end being attached to a brake rod of a master cylinder of a brake system;
the second end being attached to the actuator;
wherein the actuator is activated by a signal indicating that braking is desired, the activation including providing a first force to the second end sufficient to augment a second force from a brake pedal provided to the first end on the brake rod;
wherein the actuator provides rotational force; and
further comprising a ramp block and a slide block to provide the first force.

9. An electrically driven power brake booster comprising:
an electrically driven actuator;
a lever pivotably attached to a first pivot point, the lever having a first end and a second end;
the first end being attached to a brake rod of a master cylinder of a brake system;
the second end being attached to the actuator;
wherein the actuator is activated by a signal indicating that braking is desired, the activation including providing a first force to the second end sufficient to augment a second force from a brake pedal provided to the first end on the brake rod;
further comprising a switch capable of determining the force or displacement of the brake pedal and providing a signal; and
wherein the switch is a pressure switch capable of providing a variable signal to the actuator.

10. A kit for replacement of a power brake booster system comprising:
a mountable frame sufficiently small to fit under a dashboard of a vehicle;
an electrically driven actuator attached to the frame;
a lever pivotably attached to a first pivot point, the lever having a first end and a second end, the first pivot point being attached to the frame;
the first end being capable of attachment to a brake rod of a master cylinder of a brake system;
the second end being attached to the actuator;
a switch capable of determining the force or displacement of a brake pedal and providing a signal;
wherein the actuator is activated by the signal, the activation including providing a first force to the second end sufficient to augment a second force from the brake pedal provided to the first end on the brake rod;
wherein the actuator provides rotational force; and
further comprising a ramp block and a slide block to provide the first force.

11. A kit for replacement of a power brake booster system comprising:
a mountable frame sufficiently small to fit under a dashboard of a vehicle;
an electrically driven actuator attached to the frame;
a lever pivotably attached to a first pivot point, the lever having a first end and a second end, the first pivot point being attached to the frame;
the first end being capable of attachment to a brake rod of a master cylinder of a brake system;
the second end being attached to the actuator;
a switch capable of determining the force or displacement of a brake pedal and providing a signal;
wherein the actuator is activated by the signal, the activation including providing a first force to the second end sufficient to augment a second force from the brake pedal provided to the first end on the brake rod; and
wherein the switch is a pressure switch capable of providing a variable signal to the actuator.

12. An electrically driven power brake system comprising:
an electrically driven actuator;
a lever pivotably attached to a first pivot point, the lever having a first end and a second end;
the first end being attached to a brake rod of a master cylinder of a brake system;
the second end being attached to the actuator;
wherein the actuator is activated by a signal indicating an amount of braking required, the activation including providing a force to the second end sufficient to drive the brake rod into the master cylinder with sufficient force to provide the desired amount of braking;
wherein the actuator provides rotational force; and
further comprising a ramp block and a slide block to provide the first force.

13. An electrically driven power brake system comprising:
an electrically driven actuator;
a lever pivotably attached to a first pivot point, the lever having a first end and a second end;
the first end being attached to a brake rod of a master cylinder of a brake system;
the second end being attached to the actuator;
wherein the actuator is activated by a signal indicating an amount of braking required, the activation including providing a force to the second end sufficient to drive the brake rod into the master cylinder with sufficient force to provide the desired amount of braking;
further comprising a switch capable of determining the force or displacement of a brake pedal and providing a signal; and
wherein the switch is a pressure switch capable of providing a variable signal to the actuator.

* * * * *